(12) United States Patent
Falik

(10) Patent No.: US 6,263,425 B1
(45) Date of Patent: Jul. 17, 2001

(54) CIRCUIT THAT IMPLEMENTS SEMAPHORES IN A MULTIPROCESSOR ENVIRONMENT WITHOUT RELIANCE ON ATOMIC TEST AND SET OPERATIONS OF THE PROCESSOR CORES

(75) Inventor: Ohad Falik, Kfar Saba (IL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 08/889,796

(22) Filed: Jul. 8, 1997

(51) Int. Cl.$^7$ .................. G06F 9/52; G06F 9/46
(52) U.S. Cl. .............. 712/228; 712/217; 712/248; 712/42; 710/19; 709/226
(58) Field of Search .................. 710/17, 19, 18, 710/20, 12, 109, 108, 220, 200, 240, 129, 74, 8, 260; 711/213, 520, 108, 146, 156; 712/245, 288, 217, 42, 10, 208; 714/25; 709/314, 214, 201, 213, 215, 229, 248, 226

(56) References Cited

U.S. PATENT DOCUMENTS

| | | | |
|---|---|---|---|
| 5,276,886 | * | 1/1994 | Dror .................................. 710/240 |
| 5,367,690 | * | 11/1994 | Schiffleger ........................ 711/213 |
| 5,594,880 | * | 1/1997 | Moyer et al. ..................... 710/200 |

* cited by examiner

*Primary Examiner*—Daniel H. Pan
(74) *Attorney, Agent, or Firm*—Stallman & Pollock LLP

(57) ABSTRACT

A hardware semaphore is one bit wide. A first hardware circuit detects one of the processes is writing a new value to the semaphore and forces the hardware semaphore to the new value written. A plurality of second hardware circuits are provided. Each second hardware circuit is associated with a separate one of the plurality of processes. Each of the particular second hardware circuit includes a detecting circuit that detects the processor with which the particular second hardware circuit is associated is attempting to write the new value to the semaphore. A circuit responsive to the detecting circuit provides the current value of the semaphore, before the write, to an output of the second particular hardware circuit.

16 Claims, 4 Drawing Sheets

| | Set 0 | Set 1 | Set 2 | Set 3 |
|---|---|---|---|---|
| P1 | CREnSS0 | CREnSS1 | CREnSS2 | CREnSS3 |
| | CREnSC0 | CREnSC1 | CREnSC2 | CREnSC3 |
| | CREnST0 | CREnST1 | CREnST2 | CREnST3 |
| | CREnSV0 | CREnSV1 | CREnSV2 | CREnSV3 |
| P2 | EnCRSS0 | EnCRSS1 | EnCRSS2 | EnCRSS3 |
| | EnCRSC0 | EnCRSC1 | EnCRSC2 | EnCRSC3 |
| | EnCRST0 | EnCRST1 | EnCRST2 | EnCRST3 |
| | EnCRSV0 | EnCRSV1 | EnCRSV2 | EnCRSV3 |

FIG. 7

| 7 | 4 | 3 | 2 | 1 | 0 |
|---|---|---|---|---|---|
| reserved | | SS03 | SS02 | SS01 | SS00 |

| 7 | 4 | 3 | 2 | 1 | 0 |
|---|---|---|---|---|---|
| reserved | | SS13 | SS12 | SS11 | SS10 |

| 7 | 4 | 3 | 2 | 1 | 0 |
|---|---|---|---|---|---|
| reserved | | SS23 | SS22 | SS21 | SS20 |

| 7 | 4 | 3 | 2 | 1 | 0 |
|---|---|---|---|---|---|
| reserved | | SS33 | SS32 | SS31 | SS30 |

FIG. 8

| 7 | 4 | 3 | 2 | 1 | 0 |
|---|---|---|---|---|---|
| reserved | | SC03 | SC02 | SC01 | SC00 |

| 7 | 4 | 3 | 2 | 1 | 0 |
|---|---|---|---|---|---|
| reserved | | SC13 | SC12 | SC11 | SC10 |

| 7 | 4 | 3 | 2 | 1 | 0 |
|---|---|---|---|---|---|
| reserved | | SC23 | SC22 | SC21 | SC20 |

| 7 | 4 | 3 | 2 | 1 | 0 |
|---|---|---|---|---|---|
| reserved | | SC33 | SC32 | SC31 | SC30 |

FIG. 9

| 7 | 4 | 3 | 2 | 1 | 0 |
|---|---|---|---|---|---|
| reserved | | ST03 | ST02 | ST01 | ST00 |

| 7 | 4 | 3 | 2 | 1 | 0 |
|---|---|---|---|---|---|
| reserved | | ST13 | ST12 | ST11 | ST10 |

| 7 | 4 | 3 | 2 | 1 | 0 |
|---|---|---|---|---|---|
| reserved | | ST23 | ST22 | ST21 | ST20 |

| 7 | 4 | 3 | 2 | 1 | 0 |
|---|---|---|---|---|---|
| reserved | | ST33 | ST32 | ST31 | ST30 |

FIG. 10

| 7 | 4 | 3 | 2 | 1 | 0 |
|---|---|---|---|---|---|
| reserved | | SV03 | SV02 | SV01 | SV00 |

| 7 | 4 | 3 | 2 | 1 | 0 |
|---|---|---|---|---|---|
| reserved | | SV13 | SV12 | SV11 | SS10 |

| 7 | 4 | 3 | 2 | 1 | 0 |
|---|---|---|---|---|---|
| reserved | | SV23 | SV22 | SV21 | SS20 |

| 7 | 4 | 3 | 2 | 1 | 0 |
|---|---|---|---|---|---|
| reserved | | SV33 | SV32 | SV31 | SV30 |

CIRCUIT THAT IMPLEMENTS SEMAPHORES IN A MULTIPROCESSOR ENVIRONMENT WITHOUT RELIANCE ON ATOMIC TEST AND SET OPERATIONS OF THE PROCESSOR CORES

TECHNICAL FIELD

The present invention relates to a circuit that implements semaphores in a multiprocessor environment and, in particular, to such a circuit that does not rely on atomic test and set operations of the processor cores.

BACKGROUND

The use of single bit semaphores for signalling between computer implemented processes is well known. In general, a single bit semaphore is used in a scheme to prevent multiple processes from simultaneously accessing a single resource of a system. It is important that a single bit semaphore be accessible only in an "atomic" manner. That is, it must be guaranteed that a semaphore cannot be modified by a second process between the time that a first process reads the semaphore and potentially modifies the semaphore.

One conventional mechanism for guaranteeing such exclusivity of access includes the use of a "lock" signal. For example, the x86 family of processors provide a lock instruction that provides a serialization mechanism such that a resource (as represented by the semaphore) is restricted for use by the holder of the lock (i.e., the process that executed the lock instruction). In particular, executing a lock instruction causes a lock signal to be asserted. While the lock signal is asserted, no other process can access the semaphore. This exclusion is guaranteed by additional circuitry that stalls simultaneous access to the memory that holds the semaphore between the read and the write of the test and set operation.

While some processor architectures include the lock signal, other processors do not. With such processors, a similar mechanism may be implemented using a general purpose I/O signal assigned to generate the lock signal. It is also known to implement a lock mechanism using a dedicated hardware circuit, as disclosed by Dror in U.S. Pat. No. 5,276,886.

SUMMARY

In accordance with the present invention, a single bit semaphore circuit is provided. In accordance with the invention, each process that uses a particular single bit semaphore has associated with it semaphore interface circuitry.

The hardware semaphore is one bit wide. A first hardware circuit detects one of the processes is writing a new value to the semaphore and forces the hardware semaphore to the new value written. A plurality of second hardware circuits are provided. Each second hardware circuit is associated with a separate one of the plurality of processes. Each of the particular second hardware circuit includes a detecting circuit that detects the processor with which the particular second hardware circuit is associated is attempting to write the new value to the semaphore; and means responsive to the detecting circuit that provides the current value of the semaphore, before the write attempt, to an output of the second particular hardware circuit.

In operation, a process writes to the Set.i bit or Clear.i bit of the set and clear circuitry, respectively, associated with the process and then reads from the Test.i bit of the storage circuitry associated with the process. If the read value of the Test.i bit indicates that the Test.i bit was asserted before the write, then this indicates that the attempted "lock" of the semaphore by the process failed. Put another way, if the Test.i bit was asserted before the write, the semaphore is presently being controlled by another process. Similarly, if the Test.i bit was not asserted before the write, the semaphore is presently not being controlled by another process (and is now controlled by the setting process).

BRIEF DESCRIPTION OF THE FIGURES

FIG. 7 illustrates the CREnSS0–CREnSS3 register formats (FIG. 6).

FIG. 8 illustrates the CREnSC0–CREnSC3 register formats (FIG. 6).

FIG. 9 illustrates the CREnST0–CREnST3 register formats (FIG. 6).

FIG. 10 illustrates the CREnSV0–CREnSV3 register formats (FIG. 6).

DETAILED DESCRIPTION

Figure 1:
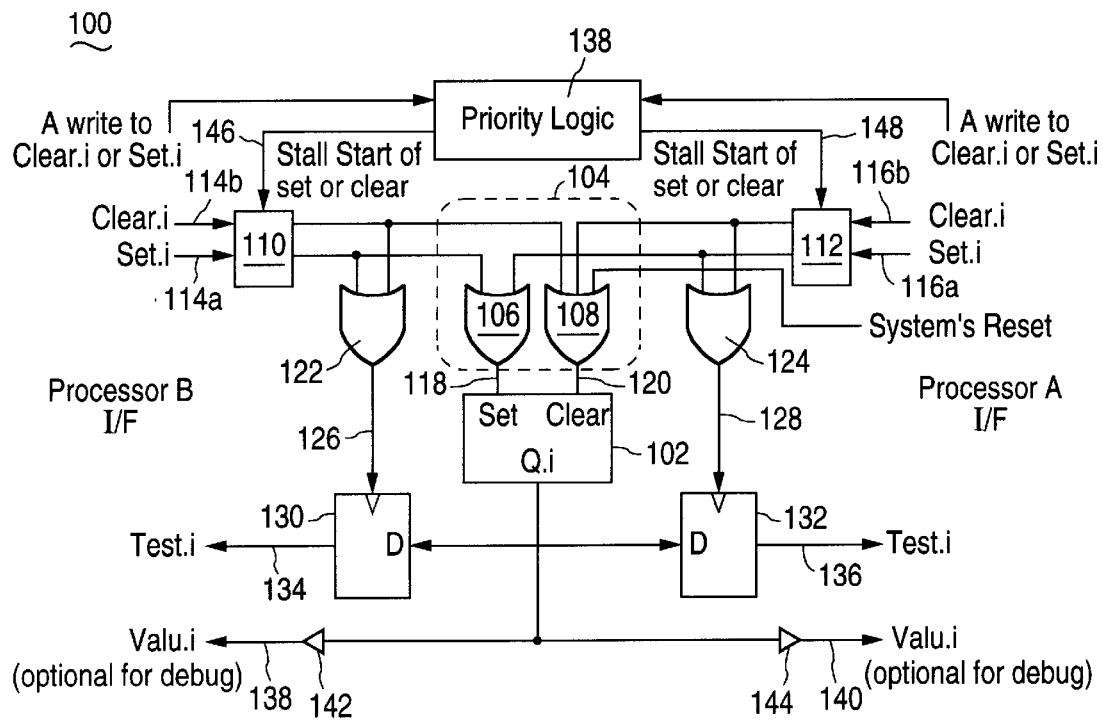
FIG. 1 illustrates, in block form, a semaphore circuit.

FIG. 1 illustrates, in block form, a semaphore circuit 100 in accordance with an embodiment of the invention. A hardware semaphore 102 holds the value of a one-bit wide semaphore, where the value held is provided at either the "set" or "clear" input of the hardware semaphore 102.

A first detector 104, including a first OR device 106 and a second OR device 108, detects that one of the processors is writing a new value to the hardware semaphore 102. In particular, disregarding for now the extending circuits 110 and 112 (discussed in detail later), if either the Set.i input 114a or the Set.i input 116a is asserted (as a result of a "set" value of "1" being written by the Processor B or Processor A, respectively), then the output 118 of the first OR device 106 is asserted to the "Set" input of the hardware semaphore 102. Similarly, if either the Clear.i input 114b or the Clear.i input 116b is asserted (as a result of a "clear" value of "1" being written by the Processor B or Processor A, respectively), then the output 120 of the second OR device 108 is asserted to the "Clear" input of the hardware semaphore 102. In the described embodiment, writing a value of "0" to the Set.i input 114a or 116a or to Clear.i input 114b or 116b has no effect.

Meanwhile, the OR device 122 detects whether either the Set.i input 114a or the Clear.i input 114b is asserted and, if either are asserted, the output 126 of the OR device 122 is asserted. The output 126 of the OR device 122 is connected to a clock input of a flip flop circuit 130. The output 126 of the OR device 122 being asserted causes the previously held value in the hardware semaphore 102, provided from the Q.i output of the hardware semaphore 102 to the D input of the flip flop circuit 130, to be provided to the Test.i output 134 of the flip flop circuit 130.

In a similar manner, the OR device 124 detects whether either the Set.i input 116a or the Clear.i input 116b is asserted and, if either are asserted, the output 128 of the OR device 122 is asserted. The output 128 of the OR device 124 is connected to a clock input of a flip flop circuit 132. The output 128 of the OR device 124 being asserted causes the previously held value in the hardware semaphore 102, provided from the Q.i output of the hardware semaphore 102 to the D input of the flip flop circuit 132, to be provided to the Test.i output 136 of the flip flop circuit 132. That is, in response to the detection, the value in the hardware semaphore 102 before the write is held at the Test.i output 136.

At any time, the value of the hardware semaphore 102 is available to Processor B and Processor A at Valu.i outputs 138 and 140, via drivers 142 and 144, respectively. However, it should be noted that the Value.i outputs 138 and 140 are not atomic with a test and set operation.

Now, the holding circuits 110 and 112, and the priority logic circuit 138 is discussed. In some situations, both Processor B and Processor A may be attempting to write a value to the semaphore circuit 102 substantially simultaneously. By "substantially", it is meant to be close enough to guarantee exclusivity of writing. For example, in a synchronous system, two writes within a certain portion of a clock cycle may be "substantially simultaneous." In an asynchronous system, two writes within a certain period as defined by signal delays within the circuitry of the system may be "substantially simultaneous". (If the processors sharing the semaphore are all on the same bus, then the priority logic circuit 138 may simply be the bus arbiter.) In this case, the priority logic circuit 138 detects the substantially simultaneous write and asserts one of a first stall signal 146 or a second stall signal 148, to the first holding circuit 110 or the second holding circuit 112, respectively. The holding circuit (110 or 112) to which the stall signal (146 or 148) is asserted stalls the start of providing the particular Set.i signal (114a or 116a) or Clear.i signal (114b or 116b) associated with the holding circuit (110 or 112) to which the stall signal (146 or 148) is asserted. This stalling extends until the write conflict is resolved and preferably ends as soon as possible thereafter. Alternately, the stall may be implemented by recording the write (by the first processor, for example) and stalling a read of the test register (by the same first processor) if the read would otherwise come before the write is completed.

It is noted that FIG. 1 illustrates a semaphore circuit for use by processes executing on two separate processors (Processor A and Processor B). These two separate processors may be physically located on a single shared bus. In this case, the priority logic circuit 138 may be the standard bus arbitration logic. Alternately, the two processors may be located on separate buses, and the priority logic circuit 138 determines priority between the two buses. If the two buses work on a time sharing principle (e.g., one works on the rising edge of a clock and the other works on the falling edge of the clock), then the priority logic 138 may not be necessary.

Figure 2:
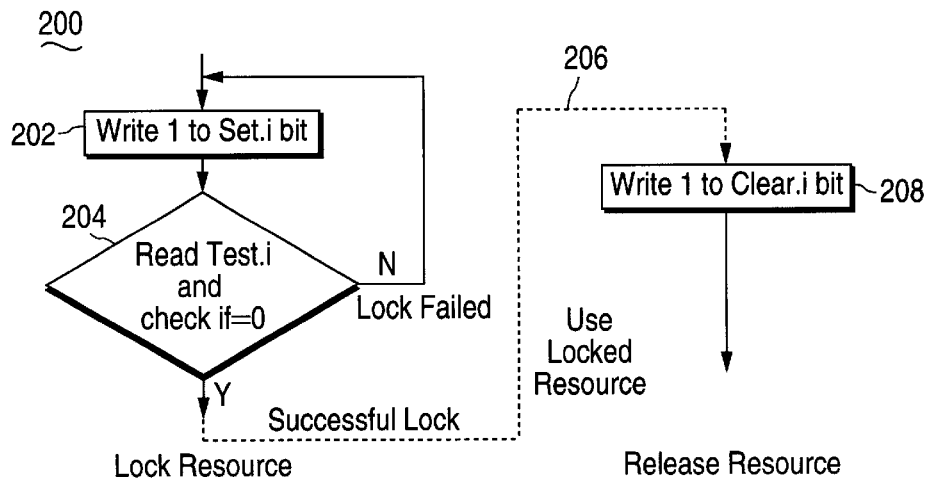
FIG. 2 illustrates a process for using the semaphore circuit.

FIG. 2 is a flowchart that illustrates a process 200 to be executed by a process that uses the semaphore circuit 100 (with the convention being that a value of "1" indicates that the semaphore is owned and a value of "0" indicates that the semaphore is not owned). At step 202, the process write a "1" to the Set.i bit associated with the process. (For example, referring back to FIG. 1, a process executing in Processor A would write a "1" to the Set.i input 116a.) At step 204, the process 200 reads the Test.i bit associated with the process. The Test.i bit read is indicative of the previous semaphore value. (For example, the process executing in Processor A would read the Test.i output 134.)

If the Test.i bit read is one at step 204, this indicates that the lock failed. That is, the Test.i bit being one indicates that another process has set the semaphore but has not yet cleared it. (Convention dictates that no process ever clears the semaphore unless that process was the one to set the semaphore.) In this case, step 202 is repeated. By contrast, if the Test.i bit read is zero at step 204, then the lock is successful. That is, the Test.i bit being zero indicates that no process is currently using the resource protected by the semaphore. In this case, the process uses the locked resource (as indicated by the dashed line 206) and, at step 208, the process writes a "1" to the Clear.i bit associated with the process.

It can be seen that the semaphore circuit 100 is particularly advantageous over many conventional semaphore circuits in that it blocks access only during a write operation, and not during a read/write operation, which is longer. For example, in a synchronous system, this blocking may only be one clock cycle. However, using a conventional semaphore mechanism, the blocking may take up to two bus transactions (and, therefore, many more than two clock cycles).

Figures 3, 6:
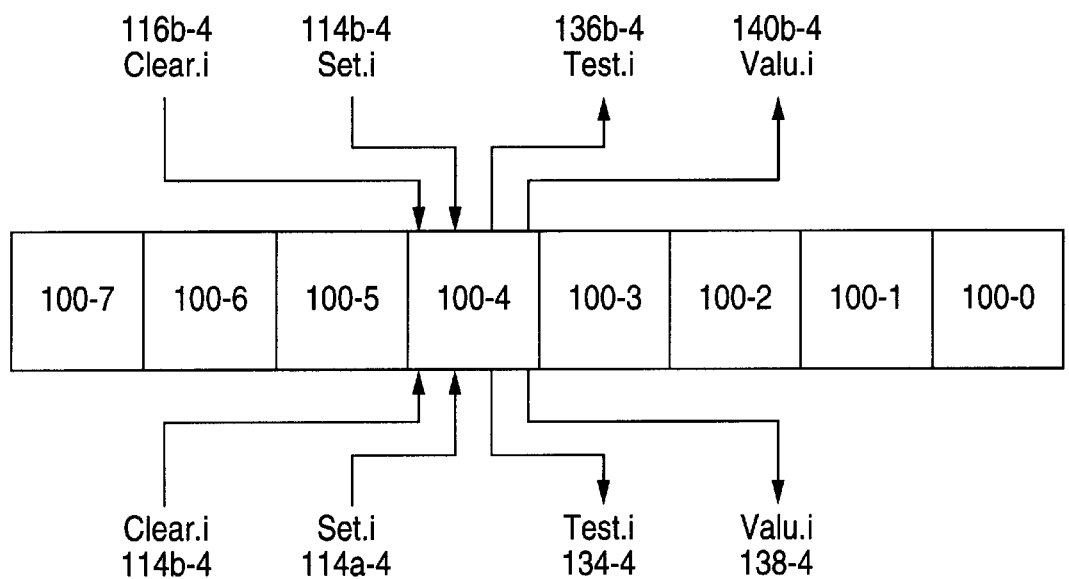
FIG. 3 illustrates a set of semaphore circuits, like the semaphore circuit of FIG. 1.
FIG. 6 illustrates a register set for semaphore operation for use by a two-processor system.

FIG. 3 is a block diagram that illustrates an eight-bit semaphore set 300 that is comprised of a set of semaphore circuits 100-0 through 100-7. Each of semaphore circuits 100-0 through 100-7 is similar to the semaphore circuit 100 illustrated in FIG. 1. Inputs and outputs to each semaphore circuit 100-0 through 100-7 are shown in a representative fashion for semaphore circuit 100-4. It is to be understood that the remaining semaphore circuits 100-0 through 100-3 and 100-5 through 100-7 have similar inputs and outputs as semaphore circuit 100-4. However, these inputs and outputs are configured such that they are collectively active at the same time through parallel bus bits. As is discussed in detail below with reference to the flowcharts of FIGS. 4 and 5, such a set 300 is useful a) multiple single bit semaphores or b) implementing counter process that is to be shared between processes (or that is to be substantially duplicated, each duplicate for use by a different process).

Figure 4:
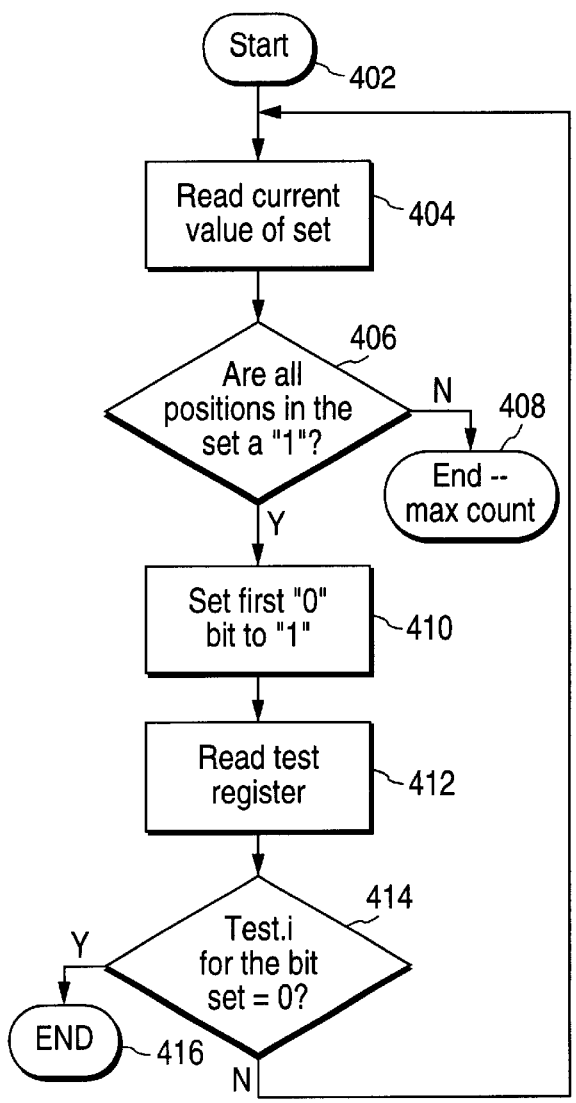
FIG. 4 illustrates a count up process that uses a set of the semaphore circuit of FIG. 1.

FIG. 4 is a flowchart that illustrates a counting subprocess (in particular, a "count up" process) that utilizes the set 300 of semaphore circuits as a unary counter from "0" to "7". At step 402, the process reads the current value of the set using the Value.i outputs of the sets of semaphore circuits 300. At step 406, the process determines if all positions are a "1". If so, then at step 408 the process ends, because the maximum capacity of the counter has been reached. Otherwise, there is at least one position with a "0", and the process writes to the Set.i input of the first available semaphore circuit at step 410. (By convention, semaphore circuit 100-0 is in the first position and semaphore circuit 100-7 is in the last position. The first available semaphore circuit is the lowest position semaphore circuit that has a "0".) At step 412, the process reads from the Test.i output of the semaphore circuit just set. If the Test.i output read is zero, this indicates that the write was successful (analogous to the "successful lock" condition of step 206 in FIG. 2). In this case, processing ends at step 416. Otherwise, the process returns to step 404 to attempt again to increment the counter.

Figure 5:
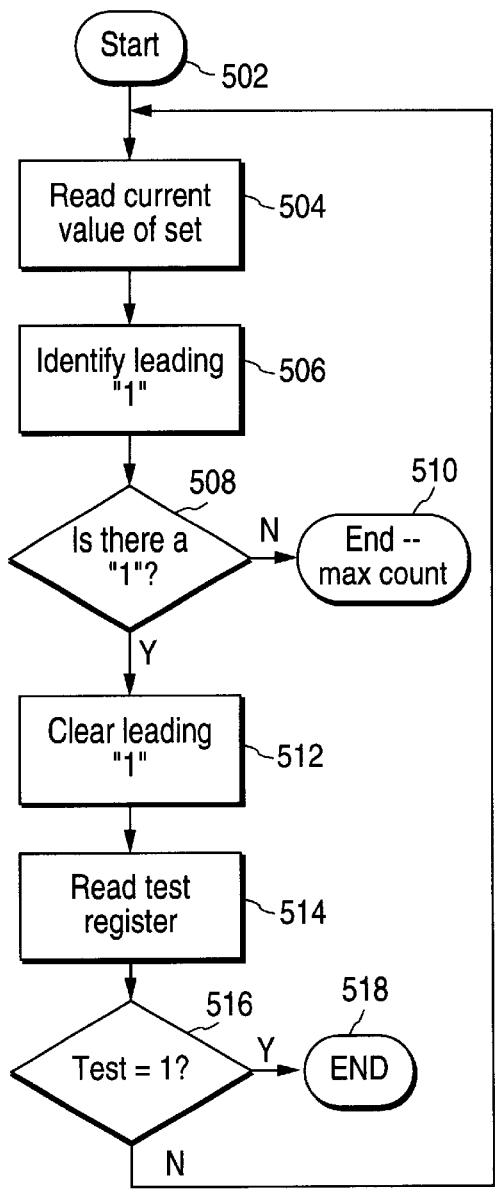
FIG. 5 illustrates a count down process that uses a set of the semaphore circuit of FIG. 1.

FIG. 5 is a flowchart that illustrates a "count down" process that utilizes the set 300 of semaphore circuits. The "count down" process is complementary to the "count up" process illustrated in FIG. 4. The process starts at step 502. At step 504, the process reads the current value of the set using the Value.i outputs of the sets of semaphore circuits 300. At step 506, the position of the leading "1" is identified. At step 508, it is determined if there is in fact a "1" anywhere in the set. If not, then the minimum count has been reached and processing ends at step 510. Otherwise, the semaphore circuit at the position of the leading "1" is cleared by writing to the Clear.i input of that semaphore circuit. At step 514, the process reads the Test.i output of the semaphore circuit just cleared. If the Test.i output read is "1", this indicates that the write was successful and processing ends at step 518. Otherwise, processing returns to step 504 to attempt again to decrement the counter.

In one embodiment of the invention where the semaphore circuit is for sharing between two processors of a processor system, embodied in a single integrated circuit, three sets of 4-bit semaphores are provided. These semaphores each have eight associated registers that provide for setting, clearing and testing the value of each semaphore by each processor. Each set of 4-bit semaphores have eight associated registers that allow setting, clearing and testing the value of the semaphore by each of the processors. FIG. 6 illustrates all the semaphore registers in the integrated circuit. It should be noted that, in the context of this description, a "register" may not include a memory element but, rather, may just be a port having circuitry to perform an associated operation when accessed.

To set a bit-semaphore, a processor writes a "1" to the respective bit in the CREnSSi register. Then, the CREnSTi register may be read to indicate the value of the semaphore prior to the set operation. In case both the first processor and the second processor try to modify one of the semaphore sets in the same clock cycle, the processor system gives priority to the first processor while access by the second processor is extended by wait-states until the access by the first processor is completed.

No processor should share registers since it is the use of the registers and, more particularly, the associated circuitry that guarantees that a test and set operation is atomic.

Semaphore Value Read registers provide the current value of the semaphore for each of the flags. These registers are most useful during debug and testing. These registers are available to both the first processor and the second processor. It should be noted that a read from these registers can not be used to guarantee that a following set or clear operation will succeed in capturing a semaphore.

The CREnSS0–CREnSS3 register formats (FIG. 6) are shown in FIG. 7. These registers are byte-wide, read only. Each register can be read by the first processor only, and holds the value of the semaphores prior to the last set or clear operation by that register.

The CREnSC0–CREnSC3 register formats (FIG. 6) are shown in FIG. 8. These registers are byte-wide, write-only. Each register can be written by the first processor only. A write of "1" to any of the bits clears the respective semaphore.

The CREnST0–CREnST3 register formats (FIG. 6) are shown in FIG. 9. These registers are byte-wide, read only. They can be read by the first processor only, and holds the value of a semaphore at the moment it is read.

The CREnSV0–CREnSV3 register formats (FIG. 6) are shown in FIG. 10. These registers are byte-wide, read-only. They can be read by the first processor only, and holds the value of a semaphore prior to the last write or clear operation.

A similar set of registers (EnCRSS0–EnCRSS3; ENCRSC0–ENCRSC3; EnCRST0–EnCRST3; and EnCRSV0–EnCRSV3) is provided for use by the second processor.

It should be understood that various alternatives to the embodiments of the invention described herein may be employed in practicing the invention. For example, a particular hardware semaphore may be shared by more than two processors (or processes executing on the same or different processors, where the processes may contend for a shared resource) by having multiple "ports" (i.e., more set, clear and test registers) for the semaphore. Each process would have its own set of ports (i.e., set, clear and test registers). However, a plurality of processes could share a set of ports if it could be guaranteed that the processes sharing the set of ports would not access the ports at the same time (e.g., if each process could prevent the other processes from operating during a semaphore access by masking interrupts). It is intended that the following claims define the scope of the invention and that methods and apparatus within the scope of these claims and their equivalents be covered thereby.

What is claimed is:

1. A multiprocessor system, including:
    a plurality of processors;
    a hardware semaphore for a shared resource, the hardware semaphore being one bit wide;
    a first hardware circuit that detects one of the processors is writing a new value to the semaphore and forces the hardware semaphore to the new value written;
    a plurality of second hardware circuits, each second hardware circuit associated with a separate one of the plurality of processors and each particular second hardware circuit including:
        a detecting circuit that detects the processor with which the particular second hardware circuit is associated is attempting to write the new value to the semaphore;
        means responsive to the detecting circuit that provides a value of the semaphore, before the writing by one of the processors, to an output of the second particular hardware circuit.

2. The multiprocessor system of claim 1, and further comprising:
    means for controlling writing to the first hardware circuit by the plurality of processors such that only one of the plurality of processors at a time can write a new value to the hardware semaphore.

3. The microprocessor system of claim 2, wherein the controlling means gives priority of writing to a predetermined one of the plurality of processors.

4. A microprocessor system as in claim 2, and further comprising:
    a common bus to which the plurality of processors are each connected wherein the controlling means consists of bus arbitration logic.

5. A microprocessor system as in claim 2, wherein the processors are not connected to a common bus.

6. The system of claim 1, wherein the output of the second particular hardware circuit is a first output, and wherein the particular second hardware circuit further includes:
    a second output, not responsive to the detecting circuit, at which a current value of the hardware semaphore is provided.

7. A semaphore circuit for use with a plurality of processes, including:
    a hardware semaphore for a shared resource, the hardware semaphore being one bit wide;
    a first hardware circuit that detects one of a plurality of processes is writing a new value to the semaphore and forces the hardware semaphore to the new value written;

a plurality of second hardware circuits, each second hardware circuit associated with a separate one of the plurality of processes and each particular second hardware circuit including:
- a detecting circuit that detects the process with which the particular second hardware circuit is associated is attempting to write the new value to the semaphore;
- means responsive to the detecting circuit that provides a value of the semaphore, before the writing by one of the processes, to an output of the second particular hardware circuit.

8. The semaphore circuit of claim 7, and further comprising:
- means for controlling writing to the hardware by the plurality of processes such that only one of the plurality of processes at a time can write a new value to the hardware semaphore.

9. The semaphore circuit of claim 8, wherein the controlling means gives priority of writing to a predetermined one of the plurality of processes.

10. The semaphore circuit of claim 7, wherein the output of the second particular hardware circuit is a first output, and wherein the particular second hardware circuit further includes:
- a second output, not responsive to the detecting circuit, at which a current value of the hardware semaphore is provided.

11. A method of maintaining a one bit wide hardware semaphore, including:
- detecting that one of a plurality of processes is writing a new value to the semaphore and forcing the hardware semaphore to the new value written;
- detecting which of the plurality of process is attempting to write the value to the semaphore;
- providing a value of the semaphore, before the writing by one of the processors, to the one of the plurality of processes detected to be attempting to write the new value, and
- controlling writing to the semaphore by the plurality of processes such that only one of the plurality of processes at a time can write a new value to the hardware semaphore, and
- wherein the controlling step gives priority of writing to a predetermined one of the plurality of processes.

12. A circuit for use with a plurality of processes for maintaining a multi-bit value, including:
- a set of hardware semaphores, each hardware semaphore being one bit wide and for holding one bit of the multi-bit value;
- for each of the set of hardware semaphores,
  - a first hardware circuit that detects one of a plurality of processes is writing a new bit of the multi-bit value to the semaphore and forces the hardware semaphore to the new value written;
  - a plurality of second hardware circuits, each second hardware circuit associated with a separate one of the plurality of processes and each particular second hardware circuit including:
    - a detecting circuit that detects the process with which the particular second hardware circuit is associated is attempting to write the new value of the multi-bit value to the semaphore;
    - means responsive to the detecting circuit that provides a value of the semaphore, before the writing by one of the processes, to a test output of the second particular hardware circuit,
- circuitry for presenting write attempt of each bit of the multi-bit value to each corresponding one hardware semaphore such that the multi-bit value is written to the set of hardware semaphores in parallel, and
- circuitry for presenting test outputs of the second hardware circuits in parallel.

13. The semaphore circuit of claim 12, and further comprising:
- means for controlling writing to the set of hardware semaphores by the plurality of processes such that only one of the plurality of processes at a time can write a new value to the set of hardware semaphore.

14. The semaphore circuit of claim 13, wherein the controlling means gives priority of writing to a predetermined one of the plurality of processes.

15. The semaphore circuit of claim 12, wherein the output of each second hardware circuit is a first output, and wherein each second hardware circuit further includes:
- a second output, not responsive to the detecting circuit, at which the current value of the hardware semaphore is provided.

16. A method of maintaining a one bit wide hardware semaphore, including:
- detecting that one of a plurality of processes is writing a new value to the semaphore and forcing the hardware semaphore to the new value written;
- detecting which of the plurality of process is attempting to write the new value to the semaphore;
- providing a value of the semaphore, before the writing by one of the processors, to the one of the plurality of processes detected to be attempting to write the new value; and
- controlling writing to the semaphore by the plurality of processes such that only one of the plurality of processes at a time can write a new value to the hardware semaphore, and
- wherein the controlling step is performed by bus arbitration logic.

* * * * *